Figure 1:
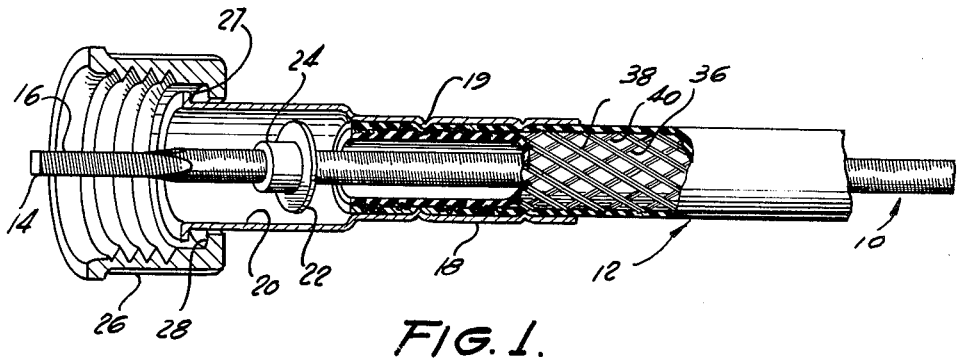

March 29, 1966   W. W. ROBINSON ET AL   3,242,691
FLEXIBLE SHAFT CASING
Filed Nov. 29, 1963

INVENTORS
Wendell W. Robinson
Walter Schmid

By A. G. Douvas
attorney.

United States Patent Office 3,242,691
Patented Mar. 29, 1966

3,242,691
FLEXIBLE SHAFT CASING
Wendell W. Robinson, Barrington, and Walter Schmid, Bensenville, Ill., assignors to Stewart-Warner Corporation, Chicago, Ill., a corporation of Virginia
Filed Nov. 29, 1963, Ser. No. 326,844
3 Claims. (Cl. 64—3)

This invention relates to the casing for a flexible shaft assembly, and more particularly, to a casing of the type having a plastic-like inner liner within which the flexible core of the shaft assembly rotates.

A flexible shaft assembly includes an inner core and an outer casing or shell enclosing the core. The core generally consists of a number of steel wires wound to concentric tight helixes to form a single elongated element. The element or core is keyed at its opposite ends to the driving and driven machine components so as to transmit rotary motion from one to the other. The casing is generally also of metallic construction and acts to confine the core to prevent it from entangling with itself when being subjected to the torque.

Since the core rotates within the casing, it is desirable to have a minimum of friction between the core and the casing. Furthermore, to provide long life without servicing of the shaft assembly, it is desirable to maintain the core in a lubricated, dirt-free condition within the casing. Thus, the casing should protect the core from ingress of dirt or the like, and should also seal any core lubricant within the casing.

The material commonly known as plastic has many characteristics desired of a flexible casing. For example, since there is generally a low coefficient of friction and wear level between plastic and metal, the friction drag between a plastic casing and a rotataing metallic core is favorable. Furthermore, a plastic casing, being impermeable to liquid, dust or the like, seals the core from the outside atmosphere to prevent ingress of dirt or moisture to the core. Plastic, also, is economical in the form of tubes so that a plastic casing and a conventional metallic core seems a likely combination.

On the other hand, however, plastic has several characteristics undesired as compared with a metallic core element. One such characteristic is the unequal coefficient of thermal expansion of plastic as compared to the metallic core element. For example, in the expectant ambient operating temperature of a flexible shaft assembly, such as from below zero to approximately 150° F., the coefficient of thermal expansion of plastic is between 10 and 15 times greater than that of steel. Consequently, when the flexible shaft assembly is subjected to a common temperature difference the lengths of the metallic core and plastic casing changes substantially. Thus, even starting with the proper core extension, binding of the core with the driving and driven components can occur to cause undesirable end loads on the bearings and side loads between the casing and core to accelerate wear and possibly even cause failure of the part.

Accordingly, an object of this invention is to provide for a flexible shaft assembly a flexible casing fabricated in part by a plastic material and in part by a metallic material, so that the shaft assembly has the desirable characteristics of both the plastics and metallic materials, but avoids the undesired characteristics of a construction totally of either of the materials.

A more detailed object of this invention is to provide for a flexible shaft assembly an outer protective casing which is of low cost construction, which has a low coefficient of friction between it and the inner flexible core, and which completely seals the core from the atmosphere.

Figure 2:
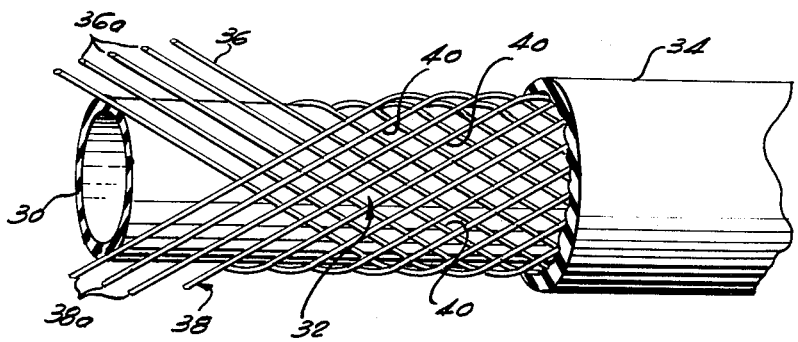

In order that these and other objects of this invention can be more fully appreciated, reference is herein made to the drawing, wherein:

FIG. 1 shows a perspective view, partly broken away and in section, of a flexible shaft assembly having one embodiment of the disclosed flexible casing; and FIG. 2 is a perspective view of a second embodiment of a casing fabricated in accordance with the subject disclosure, showing the casing in progressive steps of fabrication to disclose more clearly its construction.

FIG. 1 shows a typical flexible shaft assembly including a core 10, an outer casing 12 and an exterior connection on the core and casing adapted to be secured to the driving or driven machine component. The core 10 is commonly composed of a plurality of separate wires wound in tight helixes over one another so that the finished component is a single cylindrical member having flexibility in the transverse direction. The end 14 of the core is welded to prevent unravelling of the separate wire elements, and is shaped to a square contour 16 adapted to be keyed to a complementary receiving bore on the driving or driven component (not shown). It will be understood that various other keying means for the core are available including, for example, the tab construction used more commonly on high torque requirements. The casing 12 has secured at each end typically an annular ferrule 18 crimped as at 19 to the casing 12. The ferrule defines an elognated cylindrical portion 20 spaced from the end of the casing 12 adapted to receive and surround the free end of the core 10. A washer 22 positioned in the cylindrical portion 20 of the ferrule 18 adjacent the end of the casing acts as a thrust element for a bushing 24 crimped to the end of the core 10. A threaded socket 26 confined to the ferrule 18 by the abutting interlocking shoulders 27 and 28 is used to secure the casing 12 to a threaded plug (not shown) of the driving or driven component. The oppoiste end (not shown) of the casing can be of similar construction as that shown in FIG. 1.

FIG. 2 shows a preferred construction of the casing 12. The casing 12 includes an inner liner or tubing 30, an intermediate wire wrap 32 criss-crossed over the tubing 30, and an outer plastic covering 34 over both the tubing 30 and the wrap 32. The inner liner or tubing 30 is of a low friction plastic to provide a low friction operating surface for the inner core 10. Plastics such as nylon or a molybdenum disulphide treated plastic under such trade names as Nylatron or Plaslube are of low friction characteristics while yet being reasonable in cost when fabricated in a tube construction. The wrap 32 is preferably of two layers 36 and 38 wound in right and left-hand directions over the tubing 30, each layer consisting of a plurality of separate wires 36a and 38a. The wires are wrapped to an open design each at a generally large helical angle having a linear pitch of approximately one inch for the casing of a conventional .130″ core. The separate wires of the wrap preferably are of a low carbon steel so as to be sufficiently flexible to permit wrapping onto the inner tubing 30 without damaging the tubing. The outer covering 34 is extruded over the inner tubing 30 and the wrap 32 after the wrap is in place. The covering material preferably is of a polypropylene, polyethylene or a vinyl, the desired characteristics being a heat resistant, economical, extrudible plastic which is both flexible but self-sustaining to combine the elements together securely. The open design of the wire allows the extruded outer covering to penetrate through the many interstices 40 to the inner tubing 30 to bond therewith. In this manner it will be noted that the tubing, wrap and covering form an integral unit in which the wrap particularly is affixed to both the tubing 30 and the covering 34.

The wrap 32 employs two layers of wires wound in right and left-hand directions to eliminate the corkscrew effect of the finished casing caused by stress release during the heat of the extrusion process of the protective covering 34. The casing shown in FIG. 1 is identical to that of FIG. 2 except the separate wires 36a and 38a of the layers of wrap are wound in pairs, but still defining the open interstices 40 to the liner 30. The wires in both FIGS. 1 and 2 can be braided, but for ease of fabrication, the simple winding is preferred.

Typically, the coefficient of thermal expansion of steel is $6.3 \times 10^{-6}$ in./in./° F., while that of a plastic such as polypropylene or Plaslube is between 40 to $60 \times 10^{-6}$ in./in./° F. Consequently, if a metallic core and a totally plastic casing were used in a flexible shaft assembly and were subjected to a temperature difference, the core extension would change significantly. However, by uniting the wire wrap to the plastic tubing, in the manner as above disclosed, the axial expansion of the wrap stabilizes the axial expansion of the liner toward that of the inner metallic core. The size, number and helical angle of the wire wrap, as compared to the thickness of the tube and outer covering determine the thermal stability achieved between the casing and the core.

Thus, it is seen that the disclosed casing has the advantages of a totally plastic casing in that it is waterproof, economical, light weight and of low friction between the inner core and the casing. However, the disadvantage of unequal thermal expansion relative to a metallic inner core is no longer present. The disclosed casing also maintains a generally constant core extension upon transverse flexure of the shaft assembly, probably since the helically wound wrap and the integrally joined tubing and covering act in a manner similar to that of the wound flexible core 30.

While only a single embodiment has been disclosed it will be appreciated that many modifications can be made without departing from the disclosed inventive concept. Accordingly, it is desired that the invention be limited only by the scope of the claims hereinafter following.

What is claimed is:

1. A flexible shaft assembly comprising a flexible rotatable metal core for transmitting rotary motion between driving and driven components located a substantially fixed distance apart, an inner plastic tubing sized to receive said flexible metal core for rotation therein, a plurality of metallic wires helically wound in one direction over said inner plastic tubing at a pitch of less than 2", a second plurality of metallic wires helically wound in an opposite direction over said plastic tubing at a corresponding pitch to said first plurality of wires to form therewith a plurality of interstices communicating with said inner tubing, an extruded plastic outer covering over said wires and tubing extending into said interstices for binding said inner tube, wires and covering into a unitary assembly, and connecting means on opposite ends of said casing for securing said opposite ends of said casing to fixed supports adjacent the driving and driven machine components respectively with said wires serving to maintain the expansion and contraction of said inner tubing and outer covering in correspondence with the expansion and contraction of said metal core in response to temperature changes.

2. A flexible shaft assembly comprising a metallic core rotatably movable by a longitudinally fixed element adjacent one end of said core to impart rotatable movement to another longitudinally fixed element adjacent the other end of said core, an inner tubing of plastic having a low coefficient of friction and carrying said metallic core for rotation therein, a plurality of separate wires wound in opposing helices about said tubing at a pitch of substantially 1" so as to provide spaces between said wires communicating with said tubing, and an outer protective coating of extruded plastic over both the tubing and said wires for penetrating said spaces and binding said wires, tubing and covering into a composite unit having a temperature coefficient of expansion approximating the temperature coefficient of said metallic core.

3. A flexible shaft assembly comprising a metallic core, an inner tubing either of nylon or molybdenum disulphide treated plastic having a low coefficient of friction carrying said core for rotation therein, a plurality of low carbon steel wires helically wound in one direction at a pitch of less than 2" about said tubing, another plurality of low carbon steel wires helically wound in an opposite direction over said tubing at a substantially identical pitch to said first plurality of wires so as to define a plurality of interstices open to the tubing, and an outer protective covering of either polypropylene, polyethylene or vinyl over the tubing and the wires and extending into said interstices for binding said wires, tubing and covering into a unitary casing for said core with said wires serving to maintain the expansion and contraction of said tubing and covering at a level substantially identical to the expansion and contraction of said metallic core in response to temperature changes.

References Cited by the Examiner

UNITED STATES PATENTS

| 2,308,342 | 1/1943 | Wilkinson et al. | 138—133 |
| 2,515,929 | 7/1950 | Ofeldt | 138—138 X |
| 2,564,602 | 8/1951 | Hurst | 138—127 X |
| 2,690,769 | 10/1954 | Brown | 138—126 X |
| 3,130,754 | 4/1964 | Bratz | 138—133 |
| 3,177,901 | 4/1965 | Pierce. | |

FOREIGN PATENTS

| 1,178,569 | 5/1959 | France. |

BROUGHTON G. DURHAM, *Primary Examiner.*

D. H. THIEL, *Assistant Examiner.*